(12) United States Patent
Gallucci et al.

(10) Patent No.: US 7,148,314 B2
(45) Date of Patent: Dec. 12, 2006

(54) PROCESS FOR PREPARATION OF FUNCTIONALIZED POLYIMIDES

(75) Inventors: Robert R. Gallucci, Mt. Vernon, IN (US); Tara J. Smith, Mt. Vernon, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/886,200

(22) Filed: Jul. 7, 2004

(65) Prior Publication Data

US 2006/0009613 A1    Jan. 12, 2006

(51) Int. Cl.
*C08G 73/10* (2006.01)
*C08L 77/00* (2006.01)
*C08L 77/12* (2006.01)

(52) U.S. Cl. ............... 528/310; 528/125; 528/126; 528/128; 528/170; 528/171; 528/172; 528/173; 528/176; 528/179; 528/183; 528/185; 528/220; 528/229; 528/350; 528/351; 528/352; 528/353; 525/432; 525/434; 525/436

(58) Field of Classification Search ........ 528/170–173, 528/373, 125, 126, 128, 176, 179, 183, 185, 528/220, 229, 350, 352, 353; 525/432, 436
See application file for complete search history.

(56) References Cited

U.S. PATENT DOCUMENTS

| 2,991,273 | A | | 7/1961 | Hechelhammer et al. |
| 2,999,835 | A | | 9/1961 | Goldberg |
| 3,028,365 | A | | 4/1962 | Schnell et al. |
| 3,148,172 | A | | 9/1964 | Fox |
| 3,153,008 | A | | 10/1964 | Fox |
| 3,271,367 | A | | 9/1966 | Schnell et al. |
| 3,271,368 | A | | 9/1966 | Goldberg et al. |
| 4,217,438 | A | | 8/1980 | Brunelle et al. |
| 4,574,144 | A | * | 3/1986 | Yates et al. ............ 525/435 |
| 4,588,805 | A | | 5/1986 | Williams, Jr. |
| 5,618,334 | A | * | 4/1997 | Ozcayir et al. ............ 96/14 |
| 5,725,633 | A | * | 3/1998 | Ozcayir et al. ............ 95/45 |
| 5,744,575 | A | * | 4/1998 | Nakanishi et al. ......... 528/353 |
| 6,245,881 | B1 | * | 6/2001 | Faure et al. ............ 528/353 |
| 2005/0070684 | A1 | * | 3/2005 | Gallucci et al. .......... 528/170 |

* cited by examiner

*Primary Examiner*—P. Hampton Hightower

(57) ABSTRACT

A method for preparation of a sulfonic and or sulfonic acid salt containing polyimide resins comprising melt reaction of a polyimide resin with an organic compound, wherein the organic compound contains at least one aliphatic primary amine functionality and at least one other functionality selected from the group consisting of sulfonic acids, sulfonic acid salts or mixtures thereof.

24 Claims, No Drawings

PROCESS FOR PREPARATION OF FUNCTIONALIZED POLYIMIDES

BACKGROUND OF THE INVENTION

The present invention is directed to process to prepare sulfonate polyimides by melt reaction of an amino sulfonic acid or amino sulfonic acid salt with at least one molten polyimide resin. The process provides sulfonic acid or sulfonate salt functionalized polyimides with improved flow.

Polyimide resins with sulfonate salt functionality incorporated into the repeat units or end groups of the polymer chain, polyimide ionomer resins, have been prepared, for example in U.S. Pat. No. 4,588,805, and are of current interest in fuel cell membrane and other related systems. Polyimides with bonded sulfonic acid functionality are also useful materials for instance as exchange membranes and may be converted into various sulfonate salts by neutralization. Incorporation of sulfonate functionality, either sulfonic acid or sulfonate salt, bonded to the polymer can substantially modify polymer properties such as gas permeability, solubility and moisture absorption.

Sulfonate polyimides are usually made by multistep methods combining various monomers to build the polymer from smaller units usually in several steps using sulfonated aromatic dianhydride and/or sulfonate aryl diamine monomers as part of the polymerization process. Alternate methods involve sulfonation of preformed polyimides in solution U.S. Pat. No. 4,574,144. These are multistep processes often employing expensive and or potentially hazardous materials requiring solution polymerization. Such processes require relatively long reaction times. Processes using solvent further require that the sulfonated polymer be separated from solvent and the polymer dried of solvent. The solvent must them be recovered and purified for reuse or treated as waste. Often polyimide polymerizations require expensive aprotic polar solvents such as N-methyl pyrrolidone, dimethyl formamide, dimethyl acetamide or halogenated aromatic compounds such as chlorobenzene or dichloro benzene. Additionally starting from monomer units, polymerization to build a high molecular weight resin must be accomplished without interference from or destruction of the sulfonate functionality.

Polyimide resins are difficult to melt process, the amorphous polyimide resins have a high glass transition temperature (Tg), often above 200° C., and polyimides with useful mechanical properties are high molecular weight species. Such polyimides are generally are more difficult to melt process and form into finished articles than higher flowing crystalline resins or lower Tg amorphous thermoplastics.

DESCRIPTION OF THE INVENTION

We have found a process that allows preparation of sulfonate polyimides in the melt without the use of organic solvent. The process also produces polyimide polymers with higher melt flow, while maintaining useful mechanical and thermal properties.

In one embodiment the process to make a sulfonate modified polyimides comprises blending at least one polyimide resin with an organic compound, wherein the organic compound contains at least one aliphatic primary amine functionality and at least one other functionality selected from the group consisting of sulfonic acids, sulfonic acid salts or mixtures thereof, and heating the mixture together to affect reaction.

In another embodiment the process to make sulfonate modified polyimides comprises blending at least one high molecular weight polyimide resin with an organic compound, wherein the organic compound contains at least one aliphatic primary amine functionality and at least one other functionality selected from the group consisting of sulfonic acids, sulfonic acid salts or mixtures thereof, and heating the mixture together to affect reaction. Said organic compound containing amine and sulfonate functionality may be combined with the polyimide resin in any effective amount. In some instances the organic compound containing amine and sulfonate functionality can be used from 0.01 to 10.0% by weight of the whole mixture. In other embodiments 0.1–3.0 wt % may be used.

In this instance the term sulfonate polyimide made by the process described herein is understood to describe polyimide resins containing either sulfonic acid, sulfonate salt functionality or a mixture of the two functionalities. Said organic compound, containing at least one aliphatic primary amine functionality and at least one other functionality selected from the group consisting of sulfonic acids, sulfonic acid salts or mixtures, may also have other functional groups that do to interfere with the process to make polyimide sulfonate resins.

The organic compound containing amine and sulfonate functionality may be dissolved in an aqueous medium and added to the polyimide resin. In some instances use of an aqueous solution may aid in handling and mixing and may prevent sticking of some amine sulfonate compounds. The solution may contain a single amine sulfonate containing species of a mixture of amino sulfonate containing compounds. The aqueous amine sulfonate solution may have a concentration of organic compound containing amine and sulfonate functionality of greater than or equal to about 25 wt % or even greater than or equal to 50 wt %.

In other embodiments a process to prepare a sulfonate polyimides with improved melt flow involves combination in the melt of a polyimide with an organic compound of the following structure:

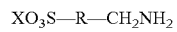

Where X=H or a metal, R=alkyl, aryl, alkylaryl or heterocyclic and contains at least one carbon atom. In another particular embodiment X is hydrogen, an alkaline metal, alkaline earth metal, zinc, tin or mixture thereof.

In some cases it may be beneficial to have an organic compound containing amine and sulfonate functionality substantially free of benzylic protons that are thought to be detrimental to thermal stability in some instances. In a similar fashion amino sulfonate compounds free of halogens such as bromine, chlorine and iodine may be desirable in some cases, for instance where a halogen free composition is desired for potential ecological benefits. In one aspect substantially free of halogen is less than 1 wt % halogen based on the weight or the organic compound having amine and sulfonate functionality.

Non limiting examples of organic compound containing amine and sulfonate functionality are; aminoethyl sulfonic acid, aminobutyl sulfonic acid, aminocyclohexyl sulfonic acid, aminocamphor sulfonic acid, taurine, aminooctadecyl sulfonic acid, diaminodecyl sulfonic acid, aminoethylbenzene sulfonic acid, aminohexyloxy benzene sulfonic acid, (aminopropylphenyl)ethyl sulfonic acid, sodium taurate, potassium taurate, iron taurate, zinc aminopropyl sulfonate, aluminum aminohexyl sulfonate, calcium amino dodecyl benzene sulfonate, disodium amino butyl diphenyl ether disulfonate, magnesium taurate, sodium-aminoethyl-methoxybenzene sulfonate, sodium-aminopentyl-nitrobenzene sulfonate and combinations thereof.

Other compounds containing amine and sulfonate functionality are selected from the group consisting of; taurine, alkaline metal salts of taurine, alkaline earth metal salts of taurine and mixtures thereof.

The polyimide resin and amino sulfonate containing compounds may be combined in various batch or continuous melt processes. A preferred embodiment is melting and mixing during extrusion in a single or twin screw extruder. The ingredients may be all combined and fed together to the extruder or added separately. In one embodiment the amino sulfonate compound may be fed down stream from the feed throat of the extruder directly to the polyimide melt. It is surprising that the reaction to improve melt flow can be accomplished in the short contact time seen in such extruders, generally less than about one or two minutes. The temperature at which mixing takes place may vary according to the polyimide structure. In some instances temperatures from 200–400° C. may be employed.

In some cases sulfonate modified polyimides made by the process of the invention polyimides have a melt flow index, as measured by ASTM D1238 at 337° C., of from 1.0 to 100.0 g/10 min. In other instances melt flow index is from 2.0 to 25.0 g/10 min.

In another embodiment the process to make a sulfonate modified polyimide comprises blending an organic compound, containing a sulfonic acid functionality and at least one aliphatic amine functionally wherein the aliphatic amine has two bonded hydrogens, with a polyimide resin and heating the mixture together to affect reaction.

In another embodiment the process to make a sulfonate modified polyimide comprises blending an organic compound, containing a sulfonic acid salt functionality and at least one aliphatic amine functionally wherein the aliphatic amine has two bonded hydrogens, with a polyimide resin and heating the mixture together to affect reaction.

In some cases the sulfonate modified polyimide resin will be substantially free of benzylic protons. Such resins are believed to have better stability in the polymer melt at high temperatures and longer times. In a similar fashion polyimide resins free of halogens such as bromine, chlorine and iodine may be desirable in some cases, for instance where a halogen free composition is desired for potential ecological benefits.

In other cases the sulfonated modified polyimide resins can have a glass transition temperature (Tg) of greater than or equal to about 200° C. as measured by ASTM method D3418-99.

Thermoplastic polyimides used as reactants to prepare sulfonate or sulfonic acid functionalized polyimides can be derived from reaction of aromatic dianhydrides or aromatic tetracarboxylic acids or their derivatives capable of forming cyclic anhydrides, and aromatic diamines or their chemically equivalent derivatives, to form cyclic imide linkages. Single polyimide resins or mixtures of different polyimide resins may be employed. The polyimide resin may be a homopolymer, copolymer or other polymer structure.

In various embodiments suitable thermoplastic polyimides comprise structural units of formula (I)

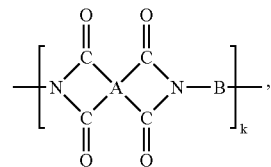

where "A" comprises structural units derived from at least one dianhydride; and "B" comprises structural units derived from at least one aromatic diamine.

In some embodiments the moiety "A" has the formula (II):

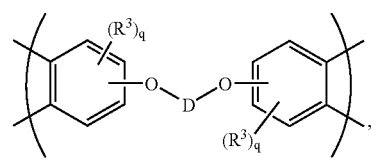

wherein $R^3$ is selected from the group consisting of halogen, fluoro, chloro, bromo, $C_{1-32}$ alkyl, cycloalkyl, or alkenyl; $C_{1-32}$ alkoxy or alkenyloxy; cyano, and "q" has a value of 0–3. In some particular embodiments the value of "q" is zero.

In the formula (II), "D" is a divalent aromatic group derived from a dihydroxy substituted aromatic hydrocarbon, and has the general formula (III):

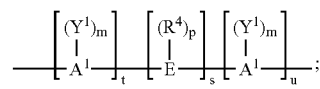

where "$A^1$" represents an aromatic group including, but not limited to, phenylene, biphenylene, naphthylene, etc. In some embodiments, "E" may be an alkylene or alkylidene group including, but not limited to, methylene, ethylene, ethylidene, propylene, propylidene, isopropylidene, butylene, butylidene, isobutylidene, amylene, amylidene, isoamylidene, etc. In other embodiments, when "E" is an alkylene or alkylidene group, it may also consist of two or more alkylene or alkylidene groups connected by a moiety different from alkylene or alkylidene, including, but not limited to, an aromatic linkage; a tertiary nitrogen linkage; an ether linkage; a carbonyl linkage; a silicon-containing linkage, silane, siloxy; or a sulfur-containing linkage including, but not limited to, sulfide, sulfoxide, sulfone, etc.; or a phosphorus-containing linkage including, but not limited to, phosphinyl, phosphonyl, etc. In other embodiments, "E" may be a cycloaliphatic group non-limiting examples of which include cyclopentylidene, cyclohexylidene, 3,3,5-trimethylcyclohexylidene, methylcyclohexylidene, bicyclo[2.2.1]hept-2-ylidene, 1,7,7-trimethylbicyclo[2.2.1]hept-2-ylidene, isopropylidene, neopentylidene, cyclopentadecylidene, cyclododecylidene, and adamantyl idene; a sulfur-containing linkage, including, but not limited to, sulfide, sulfoxide or sulfone; a phosphorus-containing linkage, including, but not limited to, phosphinyl or phosphonyl; an ether linkage; a carbonyl group; a tertiary nitrogen group; or a silicon-containing linkage including, but not limited to, silane or siloxy. $R^4$ represents hydrogen or a monovalent hydrocarbon group including, but not limited to, alkenyl, allyl, alkyl, aryl, aralkyl, alkaryl, or cycloalkyl.

In various embodiments a monovalent hydrocarbon group of $R^4$ may be halogen-substituted, particularly fluoro- or chloro-substituted, for example as in dihaloalkylidene group of formula $C=CZ_2$, wherein each Z is hydrogen, chlorine, or bromine, subject to the provision that at least one Z is chlorine or bromine; and mixtures of the foregoing moieties. In a particular embodiment, the dihaloalkylidene group is a dichloroalkylidene, particularly gem-dichloroalkylidene group. $Y^1$ may be hydrogen; an inorganic atom including, but not limited to, halogen (fluorine, bromine, chlorine, iodine); an inorganic group containing more than one inorganic atom including, but not limited to, nitro; an organic group including, but not limited to, a monovalent hydrocarbon group including, but not limited to, alkenyl, allyl, alkyl, aryl, aralkyl, alkaryl, or cycloalkyl, or an oxy group including, but not limited to, $OR^5$ wherein $R^5$ is a monovalent hydrocarbon group including, but not limited to, alkyl, aryl, aralkyl, alkaryl, or cycloalkyl; it being only necessary that $Y^1$ be inert to and unaffected by the reactants and reaction conditions used to prepare the polymer. In some particular embodiments $Y^1$ comprises a halo group or $C_1$–$C_6$ alkyl group. The letter "m" represents any integer from and including zero through the number of positions on $A^1$ available for substitution; "p" represents an integer from and including zero through the number of positions on E available for substitution; "t" represents an integer equal to at least one; "s" represents an integer equal to either zero or one; and "u" represents any integer including zero. In some particular embodiments "u" is an integer with a value of from 0 to about 5. In dihydroxy-substituted aromatic hydrocarbons in which "D" is represented by formula (III) above, when more than one $Y^1$ substituent is present, they may be the same or different. The same holds true for the $R^1$ substituent. Where "s" is zero in formula (III) and "u" is not zero, the aromatic rings are directly joined by a covalent bond with no intervening alkylidene or other bridge. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some particular embodiments the parameters "t", "s", and "u" each have the value of one; both $A^1$ radicals are unsubstituted phenylene radicals; and E is an alkylidene group such as isopropylidene. In some particular embodiments both $A^1$ radicals are p-phenylene, although both may be o- or m-phenylene or one o- or m-phenylene and the other p-phenylene.

In some embodiments of dihydroxy-substituted aromatic hydrocarbons, "E" may be an unsaturated alkylidene group. Suitable dihydroxy-substituted aromatic hydrocarbons of this type include those of the formula (IV):

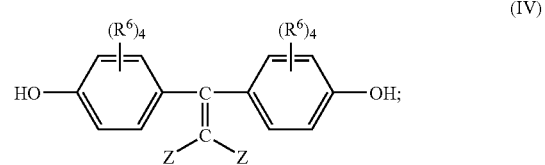

(IV)

where each $R^6$ is independently hydrogen, chlorine, bromine, or a $C_{1-30}$ monovalent hydrocarbon or hydrocarbonoxy group, each Z is hydrogen, chlorine or bromine, subject to the provision that at least one Z is chlorine or bromine.

Suitable dihydroxy-substituted aromatic hydrocarbons also include those of the formula (V):

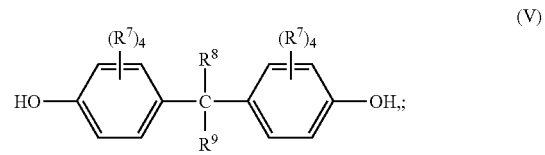

(V)

where each $R^7$ is independently hydrogen, chlorine, bromine, or a $C_{1-30}$ monovalent hydrocarbon or hydrocarbonoxy group, and $R^8$ and $R^9$ are independently hydrogen or a $C_{1-30}$ hydrocarbon group.

In embodiments of the present invention, dihydroxy-substituted aromatic hydrocarbons that may be used include those disclosed by name or formula (generic or specific) in U.S. Pat. Nos. 2,991,273, 2,999,835, 3,028,365, 3,148,172, 3,153,008, 3,271,367, 3,271,368, and 4,217,438. In some embodiments of the invention, dihydroxy-substituted aromatic hydrocarbons include, but are not limited to, bis(4-hydroxyphenyl)sulfide, bis(4-hydroxyphenyl) ether, bis(4-hydroxyphenyl)sulfone, bis(4-hydroxyphenyl)sulfoxide, 1,4-dihydroxybenzene, 4,4'-oxydiphenol, 2,2-bis(4-hydroxyphenyl)hexafluoropropane, 4,4'-(3,5,3',5'-trimethylcyclohexylidene)diphenol; 4,4'-bis(3,5-dimethyl)diphenol, 1,1-bis(4-hydroxy-3-methylphenyl)cyclohexane; 4,4-bis(4-hydroxyphenyl)heptane; 2,4'-dihydroxydiphenyl)methane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,2-bis(4-hydroxyphenyl)ethane; 1,1-bis(4-hydroxy-2-chlorophenyl)ethane; 2,2-bis(3-phenyl-4-hydroxyphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; dihydroxy naphthalene; 2,6-dihydroxy naphthalene; hydroquinone; resorcinol; $C_{1-3}$ alkyl-substituted resorcinols; methyl resorcinol, catechol, 1,4-dihydroxy-3-methylbenzene; 2,2-bis(4-hydroxyphenyl)butane; 2,2-bis(4-hydroxyphenyl)-2-methylbutane; 1,1-bis(4-hydroxyphenyl)cyclohexane; 4,4'-dihydroxydiphenyl; 2-(3-methyl-4-hydroxyphenyl-2-(4-hydroxyphenyl)propane; 2-(3,5-dimethyl-4- hydroxyphenyl)-2-(4-hydroxyphenyl)propane; 2-(3-methyl-4-hydroxyphenyl)-2-(3,5-dimethyl-4-hydroxyphenyl) propane; bis(3,5-dimethylphenyl-4-hydroxyphenyl) methane; 1,1-bis(3,5-dimethylphenyl-4-hydroxyphenyl) ethane; 2,2-bis(3,5-dimethylphenyl-4-hydroxyphenyl) propane; 2,4-bis(3,5-dimethylphenyl-4-hydroxyphenyl)-2-methylbutane; 3,3-bis(3,5-dimethylphenyl-4-hydroxyphenyl)pentane; 1,1-bis(3,5-dimethylphenyl-4-hydroxyphenyl)cyclopentane; 1,1-bis(3,5-dimethylphenyl-4-hydroxyphenyl)cyclohexane; bis(3,5-dimethyl-4-hydroxyphenyl)sulfoxide, bis(3,5-dimethyl-4-hydroxyphenyl) sulfone and bis(3,5-dimethylphenyl-4-hydroxyphenyl)sulfide. In a particular embodiment the dihydroxy-substituted aromatic hydrocarbon comprises bisphenol A.

In some embodiments of dihydroxy-substituted aromatic hydrocarbons when the moiety "E" is an alkylene or alkylidene group, it may be part of one or more fused rings attached to one or more aromatic groups bearing one hydroxy substituent. Suitable dihydroxy-substituted aromatic hydrocarbons of this type include those containing indane structural units such as 3-(4-hydroxyphenyl)-1,1,3-trimethylindan-5-ol and 1-(4-hydroxyphenyl)-1,3,3-trimethylindan-5-ol. Also included among suitable dihydroxy-substituted aromatic hydrocarbons of the type comprising one or more alkylene or alkylidene groups as part of fused rings are the 2,2,2',2'-tetrahydro-1,1'-spirobi [1H-indene]diols, illustrative examples of which include 2,2,2',2'-tetrahydro-3,3,3',3'-tetramethyl-1,1'-spirobi [1H-indene]-6,6'-diol (sometimes known as "SBI"). Mixtures comprising any of the foregoing dihydroxy-substituted aromatic hydrocarbons may also be employed.

In other embodiments "A" has the formula (VI) or (VII):

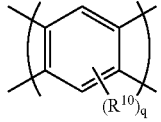

(VI)

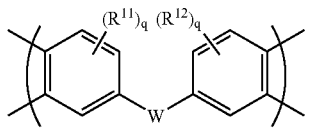

(VII)

wherein $R^{10}$–$R^{12}$ each are independently selected from hydrogen, halogen, and $C_1$–$C_6$ alkyl groups; "q" is an integer having a value of 1 up to the number of positions available on the aromatic ring for substitution; and "W" is a linking group. In particular embodiments W is a covalent bond, oxygen, sulfur, sulfoxide, sulfone, silicon, carbonyl, or hexafluoro isopropylidene. In some particular embodiments polyimides comprise structural units derived from at least one dianhydride selected from the group consisting of 2,2-bis[4-(3,4-dicarboxyphenoxy)phenyl]propane dianhydride, 2,2-bis[4-(2,3-dicarboxyphenoxy)phenyl]propane dianhydride; 2-[4-(3,4-dicarboxyphenoxy)phenyl]-2-[4-(2,3-dicarboxyphenoxy)phenyl]propane dianhydride, 4,4'-bis(3,4-dicarboxyphenoxy)benzophenone dianhydride; 4,4'-bis(3,4-dicarboxyphenoxy)diphenyl sulfone dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, 1,4,5,8-naphthalenetetracarboxylic acid dianhydride, 3,4,3',4'-benzophenonetetracarboxylic acid dianhydride, 3,3',4,4'-oxydiphthalic anhydride, 3,3',4,4'-biphenyltetracarboxylic acid dianhydride, 2,3,2',3'-biphenyltetracarboxylic acid dianhydride, pyromellitic dianhydride, 3,4,3',4'-diphenylsulfonetetracarboxylic acid dianhydride, 4,4'-bis(3,4-dicarboxyphenoxy)diphenyl sulfide dianhydride, 1,4-bis(3,4-dicarboxyphenoxy)benzene dianhydride, bis[4-(3,4-dicarboxyphenoxy)phenyl]ether dianhydride, and 2,2-bis(3,4-dicarboxyphenyl)hexafluoropropane dianhydride. Polyimides with structural units derived from mixtures comprising at least two dianhydrides are also within the scope of the invention.

In various embodiments suitable aromatic diamines comprise a divalent organic radical selected from aromatic hydrocarbon radicals having 6 to about 22 carbon atoms and substituted derivatives thereof. In various embodiments said aromatic hydrocarbon radicals may be monocyclic, polycyclic or fused.

In some embodiments suitable aromatic diamines comprise divalent aromatic hydrocarbon radicals of the general formula (VIII)

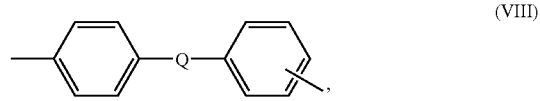

(VIII)

wherein the unassigned positional isomer about the aromatic ring is either meta or para to Q, and Q is a covalent bond or a member selected from the group consisting of formulas (IX):

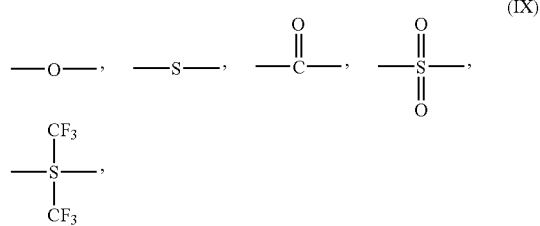

(IX)

and an alkylene or alkylidene group of the formula $C_yH_{2y}$, wherein y is an integer from 1 to 5 inclusive. In some particular embodiments y has the value of one or two. Illustrative linking groups include, but are not limited to, methylene, ethylene, ethylidene, vinylidene, halogen-substituted vinylidene, and isopropylidene. In other particular embodiments the unassigned positional isomer about the aromatic ring in formula (VIII) is para to Q.

In various embodiments the two amino groups in diamine-derived aromatic hydrocarbon radicals are separated by at least two and sometimes by at least three ring carbon atoms. When the amino group or groups are located in different aromatic rings of a polycyclic aromatic moiety, they are often separated from the direct linkage or from the linking moiety between any two aromatic rings by at least two and sometimes by at least three ring carbon atoms. Illustrative non-limiting examples of aromatic hydrocarbon radicals include phenyl, biphenyl, naphthyl, bis(phenyl) methane, bis(phenyl)-2,2-propane, and their substituted derivatives. In particular embodiments substituents include one or more halogen groups, such as fluoro, chloro, or bromo, or mixtures thereof; or one or more straight-chain-, branched-, or cycloalkyl groups having from 1 to 22 carbon atoms, such as methyl, ethyl, propyl, isopropyl, tert-butyl, or mixtures thereof. In particular embodiments substituents for aromatic hydrocarbon radicals, when present, are at least one of chloro, methyl, ethyl or mixtures thereof. In other particular embodiments said aromatic hydrocarbon radicals are unsubstituted. In some particular embodiments suitable diamines include, but are not limited to, meta-phenylenediamine; para-phenylenediamine; mixtures of meta- and para-phenylenediamine; isomeric 2-methyl- and 5-methyl-4,6-diethyl-1,3-phenylenediamines or their mixtures; bis(4-aminophenyl)-2,2-propane; bis(2-chloro-4-amino-3,5-diethylphenyl)methane, 4,4'-diaminodiphenyl, 3,4'-diaminodiphenyl, 4,4'-diaminodiphenyl ether (sometimes referred to as 4,4'-oxydianiline); 3,4'-diaminodiphenyl ether, 4,4'-diaminodiphenyl sulfone, 3,4'-diaminodiphenyl sulfone, 4,4'-diaminodiphenyl sulfide; 3,4'-diaminodiphenyl sulfide; 4,4'-diaminodiphenyl ketone, 3,4'-diaminodiphenyl ketone, 4,4'-diaminodiphenylmethane (commonly named 4,4'-methylenedianiline); 1,5-diaminonaphthalene; 3,3-dimethylbenzidine; 3,3-dimethoxybenzidine; benzidine; m-xylylenediamine; 1,3-diamino-4-isopropylbenzene; 1,2-bis(3-aminopropoxy)ethane; 2,4-bis(beta-amino-t-butyl)toluene; bis(p-beta-methyl-o-aminophenyl)benzene; bis(p-beta-amino-t-butylphenyl)ether and 2,4-toluenediamine. Mixtures of diamines may also be employed. The most preferred diamines are meta- and para-phenylene diamines, diamino diphenyl sulfone and oxydianiline. In one embodiment polyimide resins are polyetherimides, polyetherimide sulfones and mixtures thereof. Other examples of polyetherimide resins are described in ASTM method D5205-96 "Standard Classification System for Polyetherimide (PEI) Materials".

Generally, useful polyimide resins have an intrinsic viscosity greater than about 0.2 deciliters per gram, and preferably of from about 0.35 to about 1.0 deciliter per gram measured in chloroform or m-cresol at 25° C.

In another embodiment, the polyimide resin of the present invention will have a weight average molecular weight of from about 5,000 to about 100,000 grams per mole (g/mol), more preferably from about 10,000 to about 65,000 g/mol, and even more preferably from about 10,000 to about 55,000 g/mol, as measured by gel permeation chromatography, using a polystyrene standard.

In some cases it is desirable to have a polyimide resin substantially free of benzylic protons. Such resins are believed to have better stability in the polymer melt at high temperatures and longer times. In a similar fashion polyimide resins free of halogens such as bromine, chlorine and iodine may be desirable in some cases, for instance where a halogen free composition is desired for potential ecological benefits.

In other embodiments the polyimide should have a glass transition temperature of greater than or equal to 200° C. Higher temperature polyimide resins will provide a wider of range of use in applications to replace glass, metal and ceramic that requires exposure to heat.

The amino sulfonate compound can be combined with the polyimide resin in any device designed for the melting of polymers while providing at least some degree of mixing. Examples of such devices include, but are not limited to: single screw extruders, kneaders, intermeshing and non-intermeshing twin screw extruders, multi-screw extruders, calendaring systems or combinations thereof. In some instances single and twin screw extruders may be used. The ingredients may be combined prior to melting or the amino sulfonate compound may be mixed with the molten polyimide. In another embodiment a portion of the amino sulfonate organic compound may be mixed with the polyimide at room temperature and another portion added to the melt. In other instances the polyimide may be melt blended with an amino sulfonate compound to make the polyimide sulfonate resin and said polyimide sulfonate resin may be then be mixed in the melt with a second portion of amino sulfonate compound.

In one embodiment the amino sulfonic acid or amino sulfonic acid salt may be first dissolved in water and then contacted with the polyimides and then mixed in the melt. In another embodiment the aqueous amino sulfonate solution can be injected and mixed into a molten polyimide. In some cases the polyimide can be in the form or granules, powder, pellets or mixtures thereof.

The mixing can be done at any temperature sufficient to melt or soften the polyimide. In some instances temperature from 200 to 400° C. are used. In other cases temperatures from 280–380° C. are employed. The process should allow contact between the polyimide and the amino sulfonate to allow for improvement in melt flow.

The composition of the invention may be formed into shaped articles by a variety of common processes for shaping molten polymers such as injection molding, compression molding, extrusion and gas assist injection molding. Examples of such articles include, but are not limited to, electrical connectors, enclosures for electrical equipment, automotive engine parts, lighting sockets and reflectors, electric motor parts, power distribution equipment, communication equipment and the like, including devices that have molded in snap fit connectors. The sulfonate polyimide may be formed into film or sheet, may be used as coatings on film or sheet or may be used an interlayer on multilayer film, sheet constructs or extruder articles The sulfonate polyimide resins may also be used as adhesives, coatings or components of coatings or adhesives. The sulfonate polyimide resins may be blended with other ingredients such as thermoplastics, thermosets, minerals, colorants or mixtures of these materials. For example the sulfonate polyimide resins may be coated onto organic or inorganic substances such as plastics, metal, wood, leather, fibers, textiles, paper or the like.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLES

Examples of the invention are designated by numbers. Control examples are designated by letter.

Taurine salts were made using the following procedures.

Sodium Taurate: Sodium hydroxide pellets (81.56 g, 2.04 mol) were dissolved in deionized water (500 mL). 2-aminoethane sulfonic acid (Taurine) (255.15 g, 2.04 mol) was added and allowed to stir at room temperature until all the Taurine dissolved. Water was removed by rotary evaporation giving wet white crystals. The crystals were stirred with ethanol (1000 mL), isolated by filtration, and dried under vacuum.

Calcium Taurate: Calcium hydroxide powder (77 g, 1.04 mol) was combined with deionized water (520 mL), and allowed to stir at 95° C. for 15 minutes. 2-aminoethane sulfonic acid (Taurine) (260.3 g, 2.08 mol) was added and allowed to react for an additional 15 minutes. The resulting slurry was filtered to remove undissolved calcium hydroxide. Water was removed by rotary evaporation. The resulting white crystals were stirred with ethanol (1000 mL), isolated by filtration, and dried under vacuum.

Cesium Taurate: To a 50 wt-% solution of cesium hydroxide in water (250 g, 1.67 mol), aminoethane sulfonic acid (208.58 g, 1.67 mol) was added and allowed to stir at room temperature for 15 minutes. The resulting homogeneous solution was concentrated by rotary evaporation, giving a viscous colorless solution. Cesium taurate crystallized upon addition of ethanol (500 mL). The crystals were collected by filtration and dried under vacuum. Aqueous solutions were made by dissolving 20 g of taurine salt in 20 ml of water and stirring at room temperature.

The ingredients of the examples shown below in Tables 1, 2 & 3, were tumble blended on a paint shaker and then extruded on a 30 mm Werner Pfleiderer twin screw extruder with a vacuum vented mixing screw, at a barrel and die head temperature between 300 and 350° C. and 250–300 rpm screw speed. The extrudate was cooled through a water bath prior to pelletizing. Examples 1, 2, 3, 4 and 7 combined taurine or calcium taurate with polyetherimide resin (ULTEM 1000 resin from GE Plastics) in the solid form in a paint shaker prior to extrusion. In examples 5 & 6 the sodium taurate or cesium taurate was first dissolved in water to make a 50% aqueous solution by weight. This solution was then combined with the polyimide resin in a paint shaker prior to extrusion and extruded.

The composition of examples 4, 5 and 7 were dried for 4h at 150° C. and then injection molded at ~300–350° C. on an 80 ton Newberry molding machine into test parts. Tensile properties were tested at room temperature on 7×⅛ inch (17.8×0.32 cm) injection molded bars using ASTM method D648.

Melt flow was measured as MFR (melt flow rate) using ASTM test method D1238 at 337° C. using a die 8 millimeters long and 9.5 millimeters wide with an orifice of 2 millimeters and with a load of 6.7 kg. Pellets were dried for at least 2 hours at 150° C. prior to testing.

Component amounts in all the Tables are in parts by weight (pbw). Polyetherimide was a polymer of bisphenol A dianhydride and meta-phenylene diamine available as ULTEM 1000 from the GE Plastics, with Mw 34,000.

TABLE 1

| | Example | | | |
|---|---|---|---|---|
| | A | 1 | 2 | 3 |
| PEI | 100 | 99.9 | 99.7 | 9.5 |
| Taurine | 0 | 0.1 | 0.3 | 0.5 |
| MFR @ 337° C. | 8.6 | 9.5 | 13.7 | 23.2 |
| Shear Visc. @ 337 C. Pa-s | | | | |
| shear rate 122 1/sec. | 3544 | 3073 | 2247 | 1598 |
| shear rate 640 1/sec. | 1509 | 1341 | 1071 | 822 |
| shear rate 1520 1/sec | 852 | 750 | 628 | 492 |
| shear rate 3454 1/sec. | 481 | 448 | 367 | 300 |

PEI = ULTEM 1000 resin from GE Plastics

Table 1 shows the use of taurine, 2-aminoethane sulfonic acid, to improve melt flow of PEI. MFR is increased from 8.6 for the unmodified PEI to 9.5, 13.7 and 23.2 depending on the amount of taurine used. Melt viscosity was additionally measured on a capillary rheometer, shear viscosity of the sulfonate polyimide resins was measured versus shear rate on a Goettfert 2001 rheometer at 337° C. using a capillary with a length to diameter of 30:1 (30×1.0 mm). Samples were dried at least 2 hr. at 150° C. prior to testing. Shear viscosity was recorded at 3383, 1471, 807 and 490 1/sec. Note that viscosity as measured by Melt Flow Rate (MFR) or viscosity vs. shear rate is reduced (melt flow is improved) by addition of taurine, (aminoethyl sulfonic acid).

TABLE 2

| | Example | | | | | |
|---|---|---|---|---|---|---|
| | B | C | 4 | 5 | 6 | 7 |
| PEI | 100 | 99.0 | 99.5 | 99.0 | 99.5 | 99.5 |
| Water | 0 | 1.0 | 0 | * | * | 0 |
| Taurine | 0 | 0 | 0.5 | 0 | 0 | 0 |
| 50% aq. Cesium Taurate | 0 | 0 | 0 | 1.0 | 0 | 0 |
| 50% aq. Sodium Taurate | 0 | 0 | 0 | 0 | 0.5 | 0 |
| Calcium Taurate | 0 | 0 | 0 | 0 | 0 | 0.5 |
| MFR @ 337° C. g/10 min. | 8.9 | 8.5 | 21.7 | 24.9 | 17.3 | 11.3 |
| Shear Visc. @ 337 C. Pa-s | | | | | | |
| shear rate 122 1/sec. | 3383 | 3383 | 1544 | 1620 | 2108 | 2683 |
| shear rate 640 1/sec. | 1471 | 1453 | 807 | 907 | 1095 | 1240 |
| shear rate 1520 1/sec | 807 | 793 | 494 | 555 | 642 | 703 |
| shear rate 3454 1/sec. | 490 | 489 | 311 | 330 | 366 | 417 |
| Tg° C. | 219 | 219 | 219 | 219 | 219 | 219 |

PEI = ULTEM 1000 resin from GE Plastics
* salt was added as a 50 wt % aqueous solution Table 2 shows use of taurine salts of calcium, sodium or cesium to improve flow. The cesium and sodium salts were added as 50 wt % aqueous solutions. Use of an aqueous salt solution overcame a problem with the salts becoming sticky due to rapid absorption of water from the air. Note in control example C that addition of water alone did not significantly improve flow. Example 4 is a replicate of example 3 showing improved flow by use of taurine and shows good reproducibility of the melt process. In all cases the taurine salts reduce viscosity as measured by MFR or capillary rheometry. The polymer glass transition temperature (Tg) as measured by differential scanning calorimetry (DSC) is retained. Tg was measured as per ASTM method D3418-99 "Standard Test Method for Transition Temperatures of Polymers by Differential Scanning Calorimetry".

TABLE 3

Mechanical Properties

| | Example | | | |
|---|---|---|---|---|
| | B | 4 | 6 | 7 |
| PEI | 100 | 99.5 | 99.5 | 99.5 |
| Taurine | 0 | 0.5 | 0 | 0 |
| 50% aq. Sodium Taurate | 0 | 0 | 0.5 | 0 |
| Calcium Taurate | 0 | 0 | 0 | 0.5 |
| T. Modulus Mpa | 3680 | 3616 | 3609 | 35811 |
| T. Str. Yield Mpa | 106 | 108 | 108 | 107 |
| % Elong. @ yield | 7 | 6 | 7 | 7 |
| % Elong. @ break | 45 | 30 | 41 | 54 |

Table 3 shows the mechanical properties of parts injection molded from the taurine, sodium taurate and calcium taurate modified PEI. Note that tensile modulus, strength and elongation are retained compared to the unmodified polyetherimide control B.

The invention claimed is:

1. A process to make a sulfonate modified polyimide comprising blending a polyimide resin, having a number average molecular weight from 5,000 to 100,000 daltons, with an organic compound, wherein the organic compound contains at least one aliphatic primary amine functionality and at least one other functionality selected from the group consisting of sulfonic acids, sulfonic acid salts or mixtures thereof, and heating the mixture together to affect reaction.

2. A process of claim 1 wherein the organic compound has the following structure:

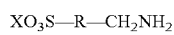    i.

where X=H or a metal, R=alkyl, aryl, alkylaryl or heterocyclic and contains at least one carbon atom.

3. A process according to claim 2 where X is hydrogen, an alkaline metal, an alkaline earth metal, zinc, tin or mixtures thereof.

4. A process according to claim 1 where said organic compound is present at 0.01 to 10.0 weight % of the whole reaction mixture.

5. A process according to claim 4 where the organic compound is present at 0.1 to 3.0 weight % of the whole reaction mixture.

6. A process according to claim 1 where said organic compound is added as an aqueous solution.

7. A process according to claim 6 where said organic compound is present at greater than or equal to 25 wt. % of the aqueous solution.

8. A process of claim 1 where the organic compound is substantially free of benzylic protons.

9. A process of claim 1 where the organic compound is substantially free of halogen atoms.

10. A process of claim 1 wherein the organic compound is selected from the group consisting of: taurine, alkaline metal salts of taurine, alkaline earth metal salts of taurine, zinc taurate and mixtures thereof.

11. A method of claim 1 wherein the polyimide resin is a polyetherimide, a polyetherimide sulfone resin or mixture thereof.

12. A process of claim 1 wherein the polyimide resin has a Tg greater than about 200° C.

13. A process of claim 1 where the polyimide resin is substantially free of benzylic protons.

14. A process of claim 1 where the polyimide resin is substantially free of halogen atoms.

15. A process of claim 1 wherein the sulfonate modified polyimide has a melt flow index as measured by ASTM D1238 at 337° C. of from 1.0 to 100.0 g/10 min.

16. A process of claim 1 where the sulfonate modified polyimide is substantially free of benzylic protons.

17. A process of claim 1 where the sulfonate modified polyimide is substantially free of halogen atoms.

18. A process of claim 1 wherein the sulfonate modified polyimide resin has a Tg greater than about 200° C.

19. A process of claim 1 wherein the polyimide and organic compound are heated in an extruder at about 200 to 400° C.

20. A composition made by the process of claim 1.

21. An article of made from the composition of claim 20.

22. An article of claim 21 selected from the group consisting of, a film, a sheet an adhesive and combinations thereof.

23. A process to make a sulfonate modified polyimide comprising blending a polyimide resin, having a number average molecular weight from 5,000 to 100,000 daltons, with an organic compound, wherein the organic compound contains at least one aliphatic primary amine functionality and at least one other functionality selected from the group consisting of sulfonic acids, sulfonic acid salts or mixtures thereof, and heating the mixture together to affect reaction. Further, said organic compound is present at from 0.01–10.0 wt. % of the whole mixture and is substantially free of benzylic protons and halogen atoms. The sulfonate modified polyimide has a melt flow index, as measured by ASTM 01238 at 337° C., of from 1.0 to 100.0 g/10 min.

24. A process to make a sulfonate modified polyimide comprising blending a polyimide resin, having a number average molecular weight from 5,000 to 100,000 daltons, with an organic compound, wherein the organic compound contains at least one aliphatic primary amine functionality and at least one other functionality selected from the group consisting of sulfonic acids, sulfonic acid salts or mixtures thereof, and heating the mixture together to affect reaction. Further, said organic compound is present at from 0.01–10.0 wt. % of the whole mixture and is substantially free of benzylic protons and halogen atoms. The sulfonate modified polyimide has a melt flow index, as measured by ASTM D1238 at 337° C. of from 1.0 to 100.0 g/10 min. and the mixture of polyimide and organic compound is heated at about 200 to 400° C.

* * * * *